United States Patent

Humes

[15] 3,690,698
[45] Sept. 12, 1972

[54] STEERING ASSEMBLY FOR TRAILERS
[72] Inventor: Carl E. Humes, 907 Franklin Ave., Steubenville, Ohio 43952
[22] Filed: Nov. 30, 1970
[21] Appl. No.: 93,685

[52] U.S. Cl. ................................................. 280/426
[51] Int. Cl. ............................................... B62d 13/02
[58] Field of Search ...................................... 280/426

[56] References Cited

UNITED STATES PATENTS

| | | | |
|---|---|---|---|
| 2,959,428 | 11/1960 | Felburn | 280/426 |
| 2,359,978 | 10/1944 | Edwards | 280/426 |
| 2,785,909 | 3/1957 | Barnard | 280/426 |

*Primary Examiner*—Benjamin Hersh
*Assistant Examiner*—Robert R. Song
*Attorney*—Stowell & Stowell

[57] ABSTRACT

An improved steering mechanism for a tractor driven plural wheeled extendable trailer wherein the motive force for steering the trailer positively extends from the fifth wheel of the tractor in the form of readily changeable tie rods to one or more turntable supporting assemblies structurally associated with one or several steerable axle assemblies supporting the trailer with means being provided for varying and limiting the degree of turning movement of each turntable assembly to maintain all of the steerable axle assemblies in proper steering relation to the tractor regardless of the operating length of the trailer.

4 Claims, 12 Drawing Figures

Patented Sept. 12, 1972

INVENTOR
Carl E. Humes
BY Stowell & Stowell
ATTORNEY

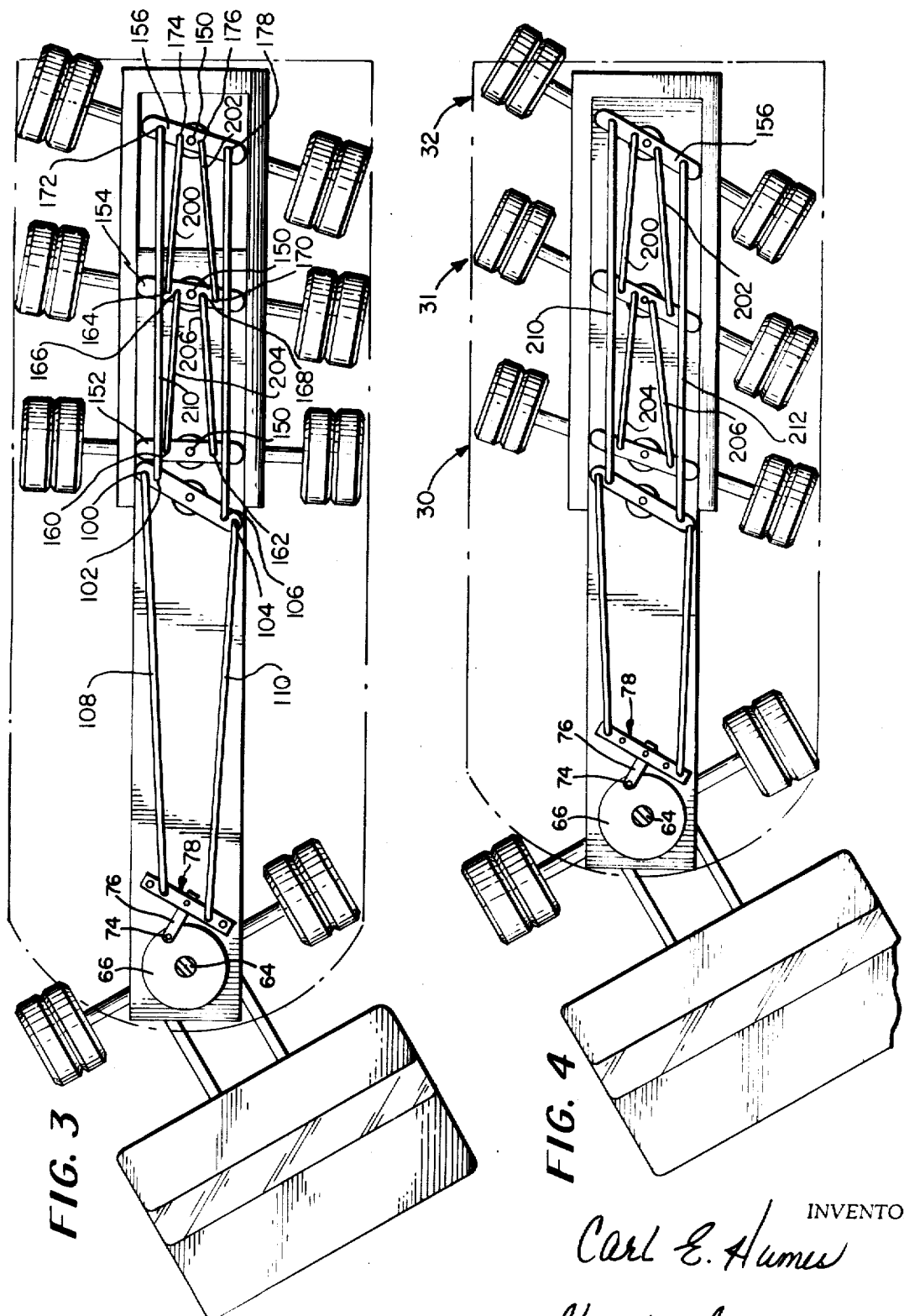

Patented Sept. 12, 1972
3,690,698
5 Sheets-Sheet 3
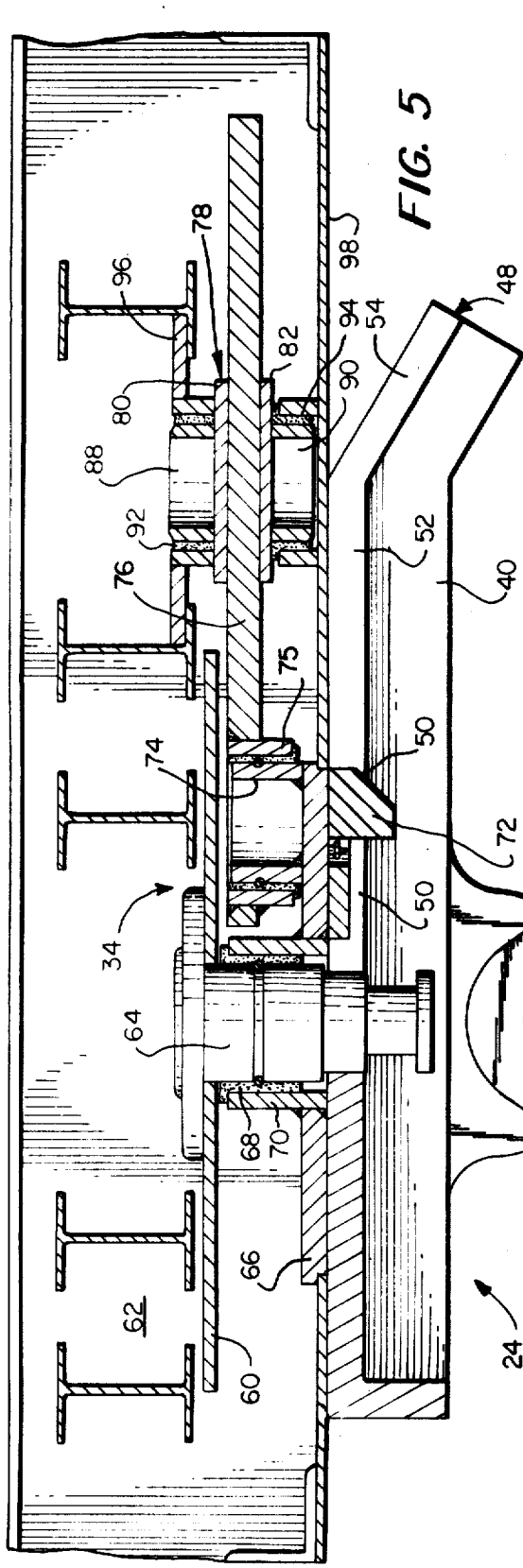
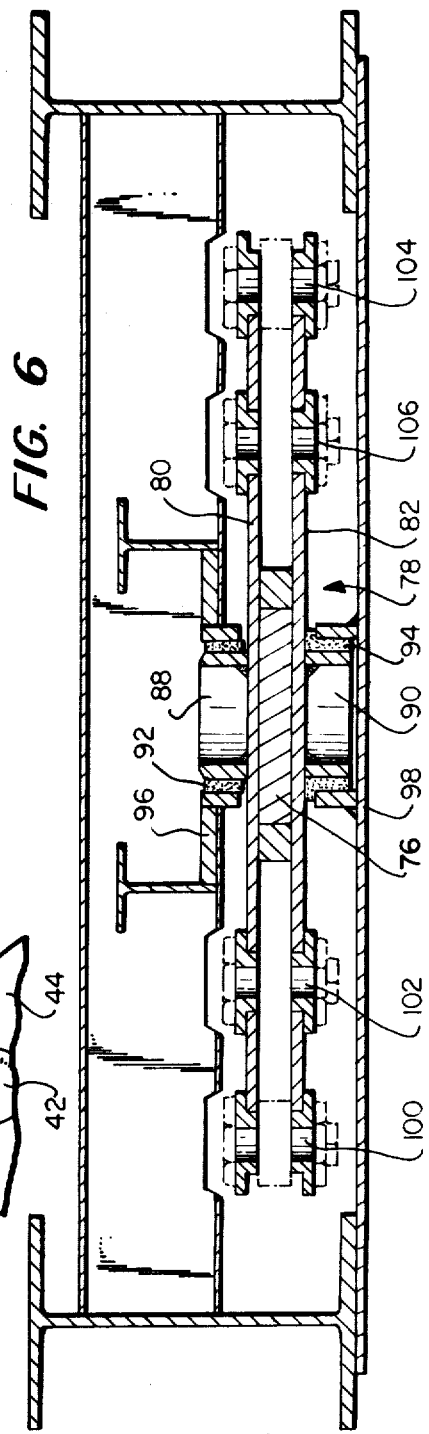
INVENTOR
Carl E. Humes
BY Stowell & Stowell
ATTORNEY

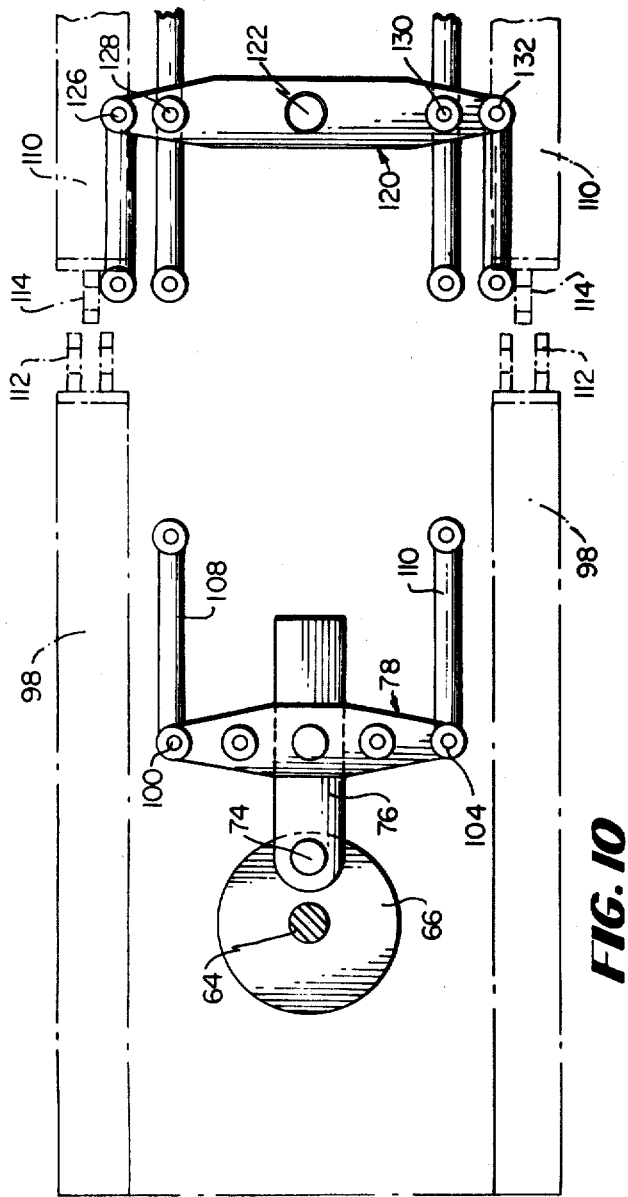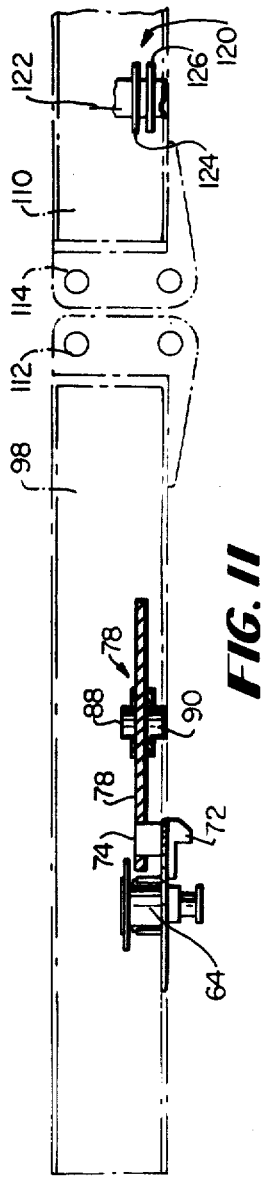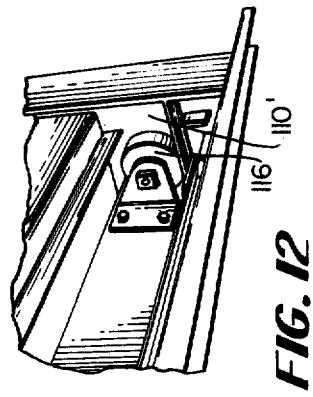

STEERING ASSEMBLY FOR TRAILERS

BACKGROUND OF THE INVENTION

1. Field of the Invention

This invention generally appertains to improvements in tractor-trailer assemblies and more particularly relates to new and novel improvements in steering assemblies for expandable trailers whereby the steerable wheeled axle assemblies of a trailer are positively steered by the movements of the towing tractor when the trailer is in fully diminished or extended positions or in any desired intermediate position.

2. Description of the Prior Art

My prior patent, U.S. Pat. No. 3,195,922 issued July 20, 1965 is exemplary of the state of the prior art in that it shows the front end of a trailer pivotally connected by a king pin to the fifth wheel of a tractor with the fifth wheel including a rearwardly opening king pin receiving slot and the rearward end of the trailer supported on pivotally mounted steerable wheeled axle assemblies. The steerable axle assemblies are connected to the fifth wheel of the tractor by chain and sprocket connections whereby turning of the tractor fifth wheel is translated into cooperative turning movement of the wheeled steerable axle assemblies of the trailer with such turning of the trailer steerable axle assemblies being predetermined and varying from a maximum at the beginning of a turn and decreasing as the tractor's degree of turn increases.

SUMMARY OF THE INVENTION

The present invention constitutes new and novel improvements over the disclosed construction and assembly in the foregoing patent as applied to extendable plural service trailers.

It is a principal object of the present invention to provide an improved steering assembly for extendable trailers including means for cooperatively steering wheeled axle assemblies for extendable trailers adapted to be towed by tractors.

It is an object of the present invention to provide such an improved steering mechanism which may be readily applied to trailers having two, three, four or more wheeled axles so that they and various combinations of the wheeled axles may be steered cooperatively to substantially eliminate sliding or dragging motion between the wheels of the trailer and the roadway when the trailer is in its diminished or extended positions.

It is another object of the present invention to provide such a system for varying the relative pivotal motion between the tractor and the trailer axle assemblies.

It is another important object of the present invention to provide such cooperative steering mechanisms wherein all of the wheeled axles may be moved in one direction and the degree of movement of each of the plural axles of the trailer may be readily controlled and varied merely by changing the length and location of tie rods connecting lever arms associated with the axles.

Another important object of the present invention is to provide such ccoperative steering mechanisms for tractor pulled extendable trailers wherein the motive force for operating the steering mechanism is positively obtained from the fifth wheel of the tractor.

Another object of the invention is to provide improved cooperative steering means for tractor hauled extendable trailers that is relatively simple in construction, rugged and relatively inexpensive to install and maintain.

These and other objects and advantages are generally provided in a multiple wheeled tractor-trailer assembly wherein the front end of the trailer is pivotally connected by a king pin to a fifth wheel assembly supported by the tractor and the tractor fifth wheel assembly is of the type wherein a fifth wheel platform has a generally V-shaped rearwardly opening king pin receiving slot, at least one wheeled axle assembly for the trailer, means mounting the wheeled axle assembly for controlled pivotal movement relative to the trailer main frame, said mounting means including a vertical shaft mounted on the trailer frame for rotation relative thereto, a first lever arm secured to rotate with the shaft, a king pin carried at the forward end of the trailer, a steering control plate mounted concentric to the king pin, a depending arm secured to the plate eccentric to the king pin and adapted to be snugly received in the fifth wheel slot rearwardly of the king pin, a second lever arm secured to rotate on a vertical axis, an operating connective member slidably carried by the second lever arm, means pivotally connecting one end of the operating member to said plate eccentric to the king pin, and tie rods connecting the first and second lever arms outboard of their pivotal axes.

This invention will be more particularly described in reference to the accompanying drawings wherein:

FIG. 3 is a view of the tractor-trailer arrangement shown in FIG. 1 with the tractor and the steerable axle assemblies of the trailer in turning positions;

FIG. 4 is a view of the tractor-trailer assembly shown in FIG. 2 with the tractor and the rear axle assemblies in turning relationship;

FIG. 5 is an enlarged fragmentary partial sectional view of the fifth wheel assembly of a tractor and the coupling steering mechanism of the trailer;

FIG. 6 is an enlarged fragmentary sectional view substantially on lines 6—6 of FIG. 10 showing details of one of the steering lever arms and tie rod connectors;

FIG. 10 is a fragmentary view of the coupling mechanism for the steering assembly and the main frame of the vehicle;

FIG. 11 is a side elevational view of the structures shown in FIG. 10; and

FIG. 12 illustrates a portion of the extension tract for the extendable frame of the trailer.

DESCRIPTION OF THE PREFERRED EMBODIMENTS

Figure 1:
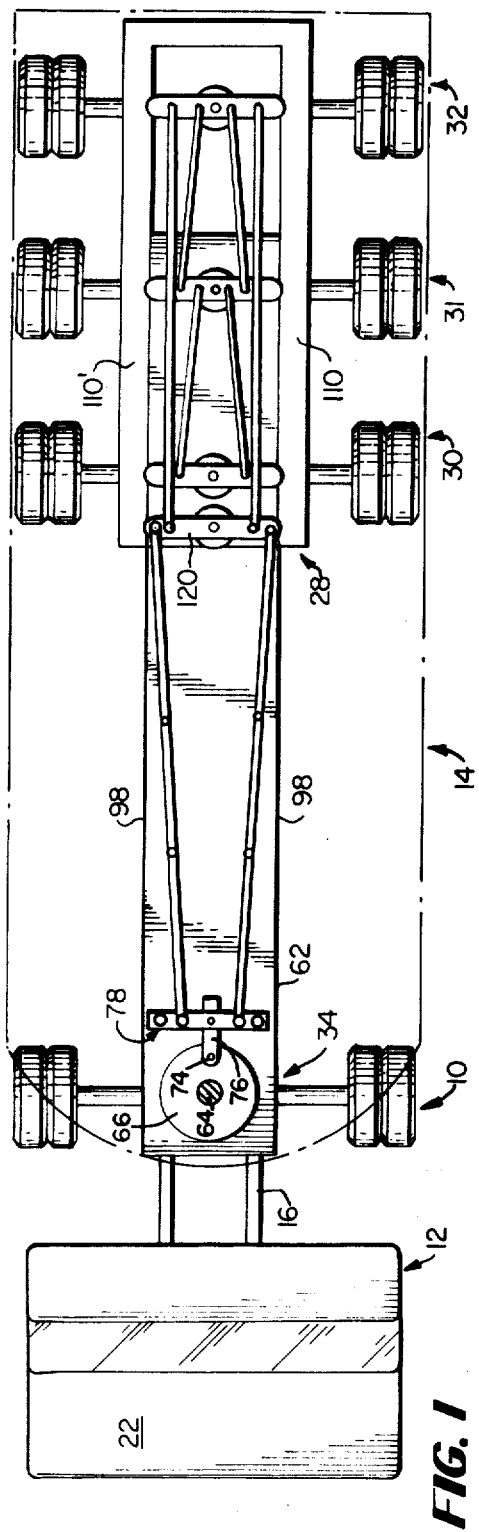
FIG. 1 is a top plane view of a tractor and extendable trailer assembly wherein the trailer is fully extended and the improved steering mechanism is arranged for minimum coupling between the tractor and the trailer rear wheel assemblies.
Figure 2:
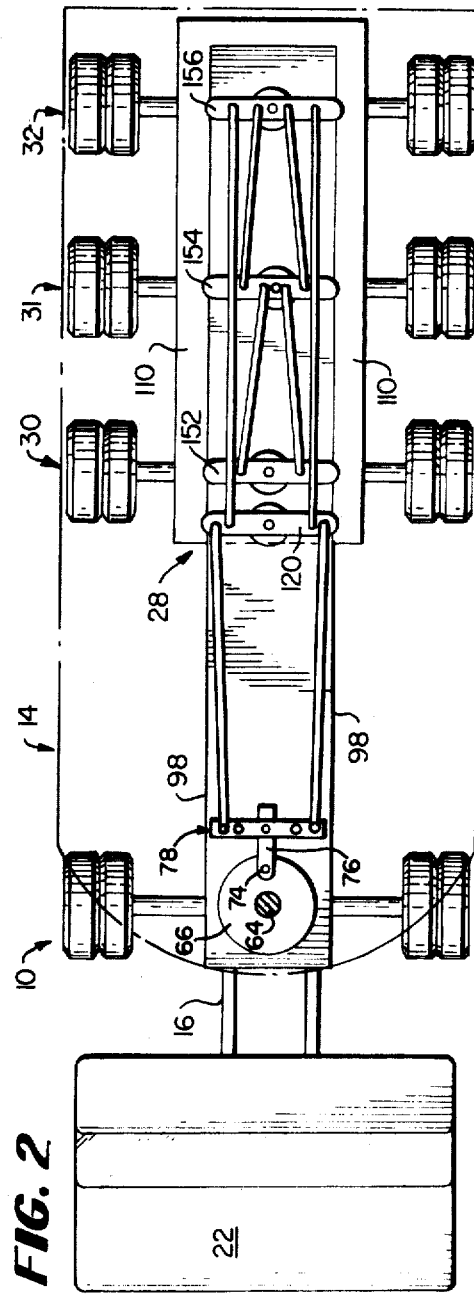
FIG. 2 is a view like FIG. 1 with the trailer in the diminished position and illustrating the steering mechanism in the maximum steering relationship.

Referring to the drawings and initially to FIGS. 1 through 4, there is illustrated a tractor-trailer assembly generally designated 10. The tractor trailer assembly includes a towing tractor 12 and a trailer 14.

The towing tractor 12 is of conventional design and includes a chassis or frame 16 having steerable front wheel assemblies not shown and non-steerable drive wheel assemblies 20. The tractor also includes a cab 22 and a conventional fifth wheel assembly 24, FIG. 5, providing the means for supporting the forward end of the trailer 14.

The trailer 14 generally includes a bed supported on extendable frame members 28, which frame members are supported at the rear end by wheeled axle assemblies generally designated 30, 31 and 32. The trailer also includes means 34 for connecting the trailer to the fifth wheel 24 of the tractor.

Referring particularly to FIG. 5, the tractor fifth wheel assembly 24 includes the fifth wheel platform 40 which is pivotally mounted for limited tilting movement on a pin 42 mounted to a boss 44 secured to the tractor frame 16. The fifth wheel platform 40 is provided with a rearwardly extending slot 48 that has a straight portion 50 and an outwardly and rearwardly tapered portion 52. The platform 40 of the fifth wheel assembly 24 includes a downwardly curved portion 54 adjacent the tapered portion of the slot 52.

Referring particularly to FIG. 5, a plate 60, that is secured to the frame member 62 of the forward section of the trailer, carries a king pin 64, which king pin is received in the king pin slot 48 of the fifth wheel 40 of the tractor. Conventional locking means for retaining the king pin 64 in the fifth wheel slot 48 are included in the assembly but not shown in the drawings as they form no specific part of the present invention.

Figure 7:
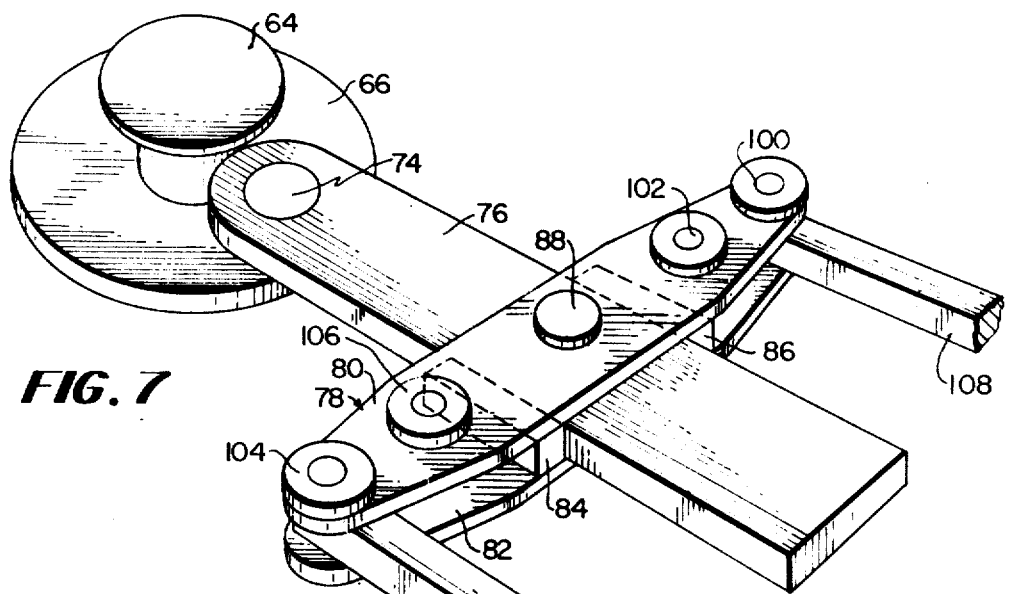
FIG. 7 is an enlarged perspective view of a portion of the mechanism connecting the fifth wheel of the tractor and the first lever arm of the steering mechanism.
Figure 8:
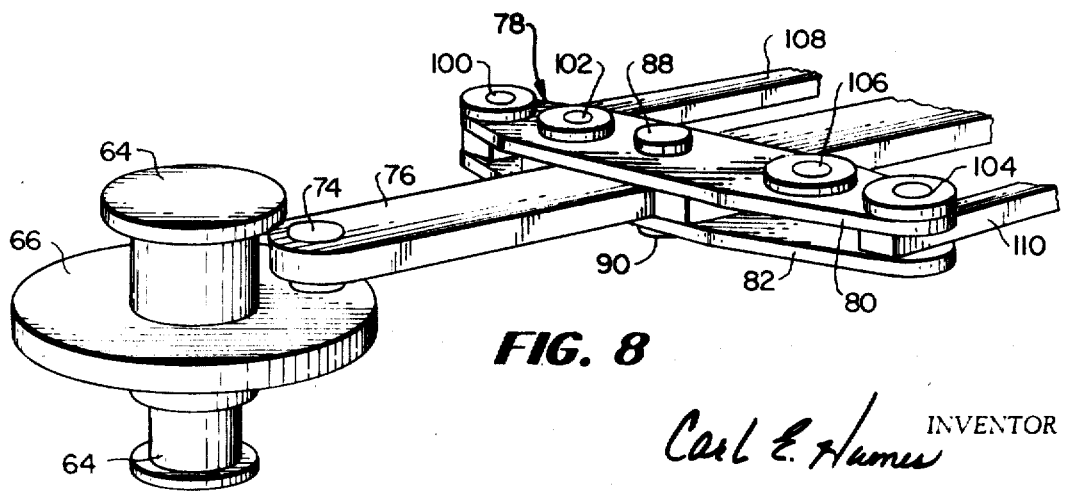
FIG. 8 is another perspective view of the mechanism illustrated in FIG. 7.

A steering control plate 66 is journalled about the king pin 64 by means of a bearing 68 and a sleeve retainer 70. The steering control plate 66 has secured thereto a depending crank arm 72 and an upstanding cylindrical shaft 74. The crank arm 72 is received in the fifth wheel slot 48 and in its operative position it is in the non-tapered straight portion 50 thereof. The shaft 74 has journalled thereabout a bearing 75, the outer cylindrical surface of which is secured to a an operating arm 76. The an operating arm 76 is slidably connected to a lever arm assembly 78 which consists of upper and lower plates 80 and 82, that are maintained in vertically spaced relationship by weldments 84 and 86 so as to provide guides for the slidable connection of the operating connective arm 76 with the lever arm assembly 78, as shown in FIGS. 5, 7 and 8. The upper plate 80 has secured thereto a cylindrical shaft 88 and a similar shaft 90 is secured to the lower portion of the lever arm 78 and the two shafts 88 and 90 are received in bearings 92 and 94 with bearing 92 supported by cross frame 96 and bearing 94 carried by bottom plate 98 of the trailer frame. The lever arm assembly 78 is provided with a number of pin receiving bores 100 and 102 at one end and 104 and 106 at the opposite end which pin receiving bores tie force transmitting tie rods 108 and 110 to the lever arm assembly, as shown in FIGS. 7 and 8.

From the foregoing description it will be seen that as the tractor turns, turning with it the fifth wheel 40, the slot 50 in the fifth wheel acting upon the crank arm 72 causes the steering control mechanism 66 to rotate about the king pin 64 shifting the position of bearing 75 connected at the forward end of slidable connective and operating arm 76. At the same time the slidable connective and operating arm causes the lever arm assembly 78 to pivot about its bearings 88 and 90. As the pivot pin 74 shifts position to the right or the left, the arm 76 takes up the difference in effective length between the center of the pin 74 and the center of the bearing elements 88 and 90 of the lever arm assembly 78. Thus, movement in the lever arm assembly 78 causes one of the tie rods 108 and 110 to move forwardly and the other to move rearwardly depending upon the direction of turn. As hereinbefore described, the steering mechanism is particularly useful with a trailer of the extensible frame type. The nature of the extendable frame of the trailer is not critical to the inventive concepts disclosed herein and various types of extendable trailers may be employed with the present invention. In FIGS. 10 and 11 extension is provided by uncoupling the forward ends of longitudinal members 98 from the rearward frame members 110 via pin or bolt connectors 112 and 114 and inserting a pair of extension frame members at the uncoupled joint. The extendable trailer may be of the sliding frame type wherein the front frame elements 98 slide between the pair of rear frame members 110', as more clearly shown in FIGS. 1, 2, 3 and 4, and in detailed view FIG. 12 wherein wheels 116 carried by the forward frame 98 slide in trackways provided by the rear frames 110', as is known in the art.

Whether the extendable trailer frame is of the type illustrated in FIGS. 10 and 11 or in FIGS. 1 through 4 and 12, just rearwardly of the forward ends of the rearward frame members 110' is pivotally mounted a further lever arm generally designated 120, as shown in FIGS. 10 and 11. The lever arm 120 is mounted for pivotal movement on a vertical pivot shaft 122 and the lever arm 120 is composed of a pair of spaced members 124 and 126 like its counterpart lever arm assembly 78. Further, the lever arm assembly 120 is provided with a plurality of tie pin receiving bores 126, 128, 130 and 132 with bores 126 and 128 being positioned on one side of bearing 122 and the other two bores 130 and 132 being positioned on the opposite end. The tie pin receiving bores 126, 128, 130 and 132 are associated with pin receiving ends of tie rods such as tie rods 108 and 110, as shown in FIGS. 10 and 11.

In the illustrated form of the invention the rearward portion of the trailer is provided with three separate wheel axle assemblies 30, 31 and 32, each of which is controllably steerable.

Each axle assembly 30, 31 and 32 is mounted for pivotal movement on a vertical shaft 150 and each of the vertical shafts has secured to rotate therewith, and with its associated axle, a lever arm assembly 152, 154 and 156 for wheel axle assemblies 30, 31 and 32, respectively. Each of the lever arm assemblies 152, 154 and 156 may be constructed in the same manner as lever arm assembly 120 and therefore each is composed of a pair of spaced but interconnected bars bored to receive tie pins for the steering control rods.

Specifically, as shown in FIG. 3, lever arm assembly 152 is provided with clevis pin receiving bores 160 and 162; lever arm assembly 154 is provided with clevis pin receiving bores 164, 166, 168 and 170; and lever arm assembly 156 is provided with clevis pin receiving bores 172, 174, 176 and 178. These three lever arm assemblies 162, 164 and 166 are all connected for controlled movement in respect to lever arm assemblies 78 and 120 in a manner determined by actual length of the extendable trailer. While a different steering ratio for the rear wheels is required as the trailer is extended or diminished in length, the variations in the steering ratios are generally provided between the lever arm assemblies 78 and 120.

Four different steering ratios are provided in the illustrated form of the invention, depending upon the positions of the tie rods 108 and 110 interconnecting the pair of lever arm assemblies 78 and 120. By varying the positions of the tie rods 108 and 110, the amount of movement of lever arm assembly 78 in respect to lever arm assembly 120 is effectively varied while lever arm assemblies 152, 154 and 156 are connected by tie rods 200, 202, 204 and 206 and lever arm assembly 156 is tied to lever arm assembly 120 by tie rods 210 and 212. It will be noted that tie rods 210 and 212 are always connected to the outboard pin receiving openings 172 and 178 of the last in the series of lever arm assembly 156; however, the opposite ends of tie rods 210 and 212 may either be positioned in the inboard or the outboard openings 100, 102, 104 or 106 of lever arm assembly 120 depending upon the openings receiving the tie rods 108 and 110 connecting lever arm assemblies 120 and 78.

Figure 9:
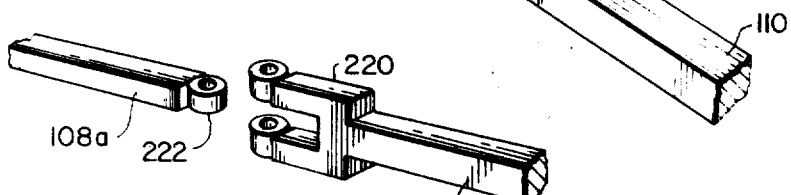
FIG. 9 is an enlarged fragmentary view of means for joining the tie rods during conversion of the trailer from its minimum to a larger size.

It will be recognized by those skilled in the art that as the length of the trailer is varies the tie rods 108 and 110 must be increased or decreased in length and in FIG. 9 there is illustrated a joint in tie rod 108 comprising a bifurcated end 220 at one end of rod 108b with a mating single ended portion 222 at the illustrated end of portion 108a of tie rod 108. A simple pin connection permits insertion and removal of intermediate length sections at such joints. The one other place where a variable length rod is required is for tie rods 210 and 212 connecting lever arm assemblies 120 and 156. Since the amount of length change in rods 210 and 212 is relatively small, in the order of about 4 to 12 inches, depending on the number and spacing of the axles, such length difference may be accommodated for by means of conventional turn buckle means rather than by physically replacing the rods.

From the foregoing description of various embodiments of the present invention it will be seen that novel steering means are provided for extendable trailers, which steering means permit varying the steering ratio between the tractor and the steerable wheels to accommodate for the different lengths of the trailer. It will be appreciated by those skilled in the art that the present invention also permits the addition and removal of certain of the wheel axle assemblies so that where extremely heavy loads are to be transported as many as, for example, eight axle assemblies may be inserted under a vehicle and after the load is removed therefrom the axles can be removed and transported on top of the trailer thereby further reducing tire wear where multiple tires are not required.

It will be further recognized by those skilled in the art that while rigid tie rods have been employed to connect the various lever arms, such interconnection may be by cables, chains or combinations of cables, chains and tie rods without departing from the scope of the present invention.

I claim:

1. In a multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, and wherein the trailer is of the expandable type and has a least one wheeled steerable axle assembly supporting the trailer, means mounting the wheeled axle assembly for controlled pivotal movement relative to the trailer main frame; said mounting means including a steering control plate journalled about the king pin, transverse frame means for the trailer, a vertical shaft means rotatably mounted on the transverse frame means of the trailer for rotation relative thereto, a first lever arm assembly mounted for rotation with the shaft means, a second lever arm assembly secured to rotate on a vertical axis, a connective operating member slidably carried by the second lever arm assembly to permit lost motion when the fifth wheel causes turning motion of the trailer, means pivotally connecting the connective operating member to said steering control plate eccentric to the king pin, and tie rods connecting the first and second lever arm assemblies outboard of their pivotal axes.

2. In a multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, and wherein the trailer is of the expandable type and has at least one wheeled steerable axle assembly supporting the trailer, means mounting the wheeled axle assembly for controlled pivotal movement relative to the trailer main frame; said mounting means including a steering control plate journalled about the king pin, transverse frame means for the trailer, a vertical shaft means rotatably mounted on the transverse frame means of the trailer for rotation relative thereto, a first lever arm assembly mounted for rotation with the shaft means, a second lever arm assembly secured to rotate on a vertical axis, a connective operating member slidably carried by the second lever arm assembly to permit lost motion when the fifth wheel causes turning motion of the trailer, means pivotally connecting the connective operating member to said steering control plate eccentric to the king pin, and tie rods connecting the first and second lever arm assemblies outboard of their pivotal axes, a third lever arm assembly secured to pivot with said at least one axle assembly, and additional tie rods connecting said second and third lever arm assemblies outboard of their pivotal axes.

3. The invention defined in claim 1 wherein the lengths of the tie rods are variable to accommodate for variations in the length of the trailer.

4. A multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, and wherein the trailer is of the expandable type and has a plurality of one wheeled steerable axle assemblies supporting the trailer, means mounting the wheeled axle assemblies for pivotal movement relative to the trailer main frame, said mounting means including a steering control plate journalled about the king pin, transverse frame means for the trailer, a vertical shaft means rotatably mounted on the transverse frame means of the trailer for rotation relative thereto, a first lever arm assembly mounted for rotation with the shaft means, a second lever arm assembly secured to rotate on a vertical axis, a connective operating member slidably carried by the second lever arm assembly to permit lost motion when the firth wheel causes a turning motion of the trailer, means pivotally connecting one end of the connective operating member to said steering control plate eccentric to the king pin, and tie rods connecting the first and second lever arm assemblies outboard of their pivotal axes, further lever arm assemblies secured to pivot with each of the plurality of wheeled axle assemblies, further tie rods connecting said second and the last in series of the further lever arm assemblies outboard of their pivotal axes, and additional tie rods connecting each of the said further lever arm assemblies.

* * * * *